United States Patent
Fujioka et al.

(10) Patent No.: US 9,041,636 B2
(45) Date of Patent: May 26, 2015

(54) LIQUID CRYSTAL DISPLAY DEVICE AND DRIVE METHOD THEREFOR

(75) Inventors: Akizumi Fujioka, Osaka (JP); Akinori Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 13/979,261

(22) PCT Filed: Jan. 10, 2012

(86) PCT No.: PCT/JP2012/050281
§ 371 (c)(1),
(2), (4) Date: Jul. 11, 2013

(87) PCT Pub. No.: WO2012/096259
PCT Pub. Date: Jul. 19, 2013

(65) Prior Publication Data
US 2013/0286302 A1    Oct. 31, 2013

(30) Foreign Application Priority Data

Jan. 14, 2011   (JP) ................................ 2011-006418

(51) Int. Cl.
*G06F 3/044* (2006.01)
*G02F 1/1333* (2006.01)
*G09G 3/36* (2006.01)

(52) U.S. Cl.
CPC .......... *G02F 1/13338* (2013.01); *G09G 3/3648* (2013.01); *G09G 2340/0435* (2013.01); *G06F 3/044* (2013.01)

(58) Field of Classification Search
CPC .................. G06F 3/044; G06F 3/3648; G09G 2340/0435; G02F 1/13338

USPC ............................................ 345/87, 173–179
See application file for complete search history.

(56) References Cited

U.S. PATENT DOCUMENTS

| | | | |
|---|---|---|---|
| 2008/0062140 A1* | 3/2008 | Hotelling et al. | 345/173 |
| 2010/0085332 A1* | 4/2010 | Takahashi et al. | 345/177 |
| 2010/0207900 A1* | 8/2010 | Kung et al. | 345/173 |

(Continued)

FOREIGN PATENT DOCUMENTS

JP   2008-165434 A   7/2008

OTHER PUBLICATIONS

Official Communication issued in International Patent Application No. PCT/JP2012/050281, mailed on Apr. 17, 2012.

(Continued)

*Primary Examiner* — Premal Patel
(74) *Attorney, Agent, or Firm* — Keating & Bennett, LLP (57) ABSTRACT

A liquid crystal display devices (1a, 1b) each include a touch panel (2), a liquid crystal panel (3), a touch panel controller (4), a liquid crystal driving controller (timing generator) (5), oscillation circuits (7a, 7b), a correcting circuit (10), and a frequency counter (11). The frequency counter (11) counts a reference clock signal CLK supplied from the oscillation circuit (7a) or (7b). The correcting circuit (10) determines, in accordance with information supplied from the frequency counter (11), whether or not a frequency of the reference clock signal CLK is a predetermined frequency. In a case where the frequency of the reference clock signal CLK is not the predetermined frequency, the correcting circuit (10) corrects (i) a frequency at which the liquid crystal panel (3) is driven or (ii) a frequency at which sensing of the touch panel (2) is carried out.

9 Claims, 7 Drawing Sheets

(56) References Cited

U.S. PATENT DOCUMENTS

2011/0063993 A1    3/2011  Wilson et al.
2011/0210941 A1*   9/2011  Reynolds et al. ............. 345/174
2012/0092296 A1*   4/2012  Yanase et al. ................. 345/174

OTHER PUBLICATIONS

Nakano, "Capacitive touch panel solution", Monthly Display 2009, Techno Times Co. Ltd., vol. 15 No. 12, Dec. 12, 2009, pp. 15-19.

* cited by examiner

LIQUID CRYSTAL DISPLAY DEVICE AND DRIVE METHOD THEREFOR

TECHNICAL FIELD

The present invention relates to a liquid crystal display device equipped with a capacitive touch panel, and a method for driving the liquid crystal display device.

BACKGROUND ART

Recent years have witnessed a great increase of tablet electronic devices such as a portable phone, a personal computer and a music player, each of which is equipped with a touch panel. Such electronic devices display various operation buttons on their display screens. This allows a user to carry out an input operation to the electronic devices in a dialogue form by touching a desired operation button with the user's finger, or a pen or the like, instead of using a conventional user interface such as a keyboard or a button.

A capacitive touch panel, which is a touch panel of a capacitive type that is one of operation types of touch panels, operates by detecting a change which is caused in a sensor by a capacitance of a human finger. One of main noises which occur during sensing of the capacitive touch panel is a driving noise of a liquid crystal module (hereinafter also referred to as a liquid crystal driving noise), which is provided in the vicinity of a back side of the capacitive touch panel. In a case where the liquid crystal driving noise is mixed into the sensing, a decrease in recognition performance of a touch panel is caused. Therefore, it has been an object to carry out sensing (scanning) which enables decreasing or avoiding a liquid crystal driving noise.

In order to avoid the mixing of the liquid crystal driving noise into sensing, in one method, a frequency of the liquid crystal driving noise and a noise frequency which is sensed by the touch panel as a noise are set so as not to overlap each other. In a case where the frequency of the liquid crystal driving noise and the noise frequency sensed by the touch panel do not overlap each other, it is possible to prevent the liquid crystal driving noise from mixing into the sensing of the touch panel. This alleviates a decrease in recognition performance of the touch panel.

Figure 9:
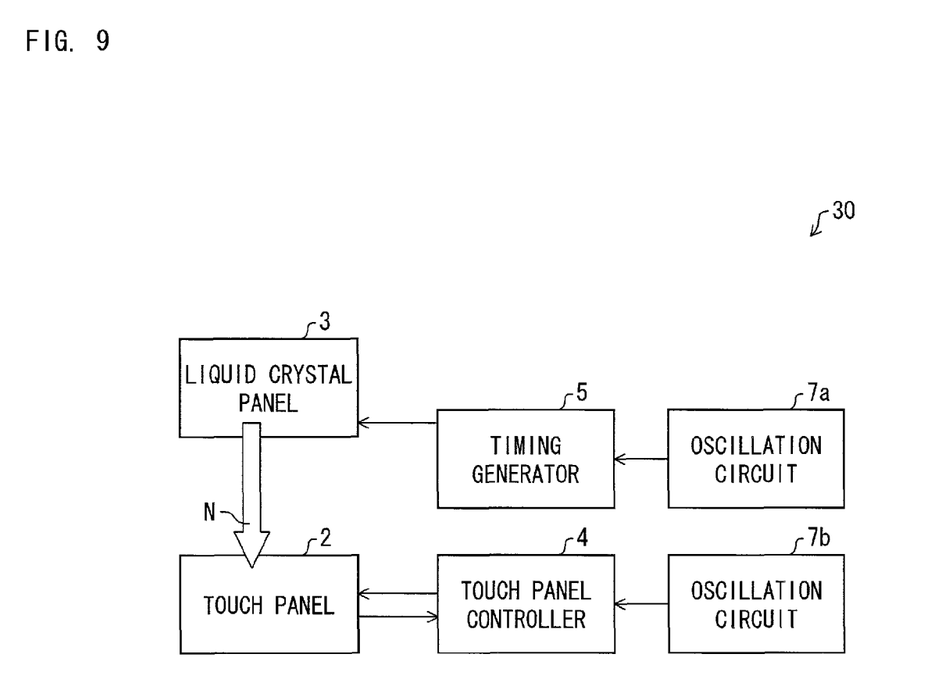
FIG. 9 is a view schematically illustrating a conventional liquid crystal display device.

A conventional liquid crystal display device is schematically illustrated in FIG. 9. As illustrated in FIG. 9, in a conventional liquid crystal display device 30, a liquid crystal driving controller (timing generator) 5 is provided with an oscillation circuit 7a which supplies a reference clock signal CLK to the liquid crystal driving controller (timing generator) 5, whereas a touch panel controller 4 of a capacitive touch panel 2 is provided with an oscillation circuit 7b which supplies a reference clock signal CLK to the touch panel controller 4. A liquid crystal panel 3 is driven in accordance with the reference clock signal CLK supplied to the timing generator 5. Similarly, the touch panel 2 carries out sensing in accordance with the reference clock signal CLK supplied to the touch panel controller 4.

A frequency of each of the reference clock signals CLK has a variation of about ±a few % to ±10%, as a device characteristic which is caused by an environmental change such as a change in temperature, or as an individual difference from an individual variation or the like. As such, in a case where there is a variation in the frequency of each of the reference clock signals CLK, there is a variation in a frequency at which a liquid crystal is driven (hereinafter also referred to as a "liquid crystal driving frequency") and in a frequency at which a touch panel is scanned (hereinafter also referred to as a "scanning frequency"). This makes it difficult to prevent the frequency of the liquid crystal driving noise and the noise frequency sensed by the touch panel from overlapping each other. This increases a possibility that the liquid crystal driving noise is mixed into the sensing of the touch panel 2 (arrow N in FIG. 9).

In order to decrease or avoid the liquid crystal driving noise, in one method, a gap between a source of the liquid crystal driving noise and a touch panel (sensor) is extended, or in another method, a shield layer is added. However, since display devices are becoming thinner nowadays, it is difficult to extend the gap between the touch panel and a liquid crystal panel, which is the source of the liquid crystal driving noise. Furthermore, newly providing the shield layer may increase costs.

In view of the problems, for example, Patent Literature 1 discloses a configuration in which liquid crystal driving is synchronized with sensing of a touch panel, so that the sensing is carried out in a blanking period of a liquid crystal. Patent Literature 1 also discloses a configuration in which, in carrying out the sensing in the blanking period, an active period is shorten in order to have a longer blanking period.

According to the above configurations, it is possible to decrease an effect of the liquid crystal driving noise since the sensing is carried out in the blanking period during which a data driver and a gate driver of a liquid crystal display device are not driven. Therefore, it is possible to prevent a decrease in recognition performance of the sensing.

CITATION LIST

Patent Literature

Patent Literature 1
Japanese Patent Application Publication, Tokukai, No. 2008-165434 A (Publication Date: Jul. 17, 2008)

SUMMARY OF INVENTION

Technical Problem

In recent years, a liquid crystal display device significantly increasingly has a higher frame frequency and a higher resolution. Then, in a case where the technique disclosed in Patent Literature 1 is applied to a liquid crystal display device which has a high frame frequency and a high resolution, it is difficult to ensure a blanking period required for touch panel sensing because writing in a liquid crystal needs to be carried out at a high speed. Therefore, it is difficult to apply the technique disclosed in Patent Literature 1 to the present liquid crystal display devices which have a high frame frequency and a high resolution.

The present invention has been made in view of the above problems, and an object of the present invention is to provide (i) a liquid crystal display device including a capacitive touch panel which, even in a case where there is a variation in a frequency, enables stably avoiding an effect caused by a liquid crystal driving noise of the liquid crystal display device, and (ii) a method for driving the liquid crystal display device.

Solution to Problem

In order to attain the object, a liquid crystal display device in accordance with one aspect of the present invention is a liquid crystal display device including: a liquid crystal panel for displaying an image supplied from outside; a driving section for driving the liquid crystal panel in accordance with a driving signal; a capacitive touch sensor for detecting a change in capacitance, the capacitive touch panel being provided so as to overlap the liquid crystal panel; a control section for scanning the capacitive touch sensor in accordance with a reference clock signal which is generated by an oscillation circuit provided in the liquid crystal display device; a counting section for counting a frequency of the driving signal; a determining section for determining whether or not the frequency of the driving signal is a predetermined value; and a changing section for changing, in a case where the determining section determines that the frequency of the driving signal is not the predetermined value, a frequency at which the capacitive touch sensor is scanned.

According to the above configuration, in a case where there is a variation in the frequency of the driving signal, the frequency at which the capacitive touch sensor is scanned is changed to a predetermined frequency. Note, here, that the liquid crystal panel is driven in accordance with the driving signal. Accordingly, having a variation in the frequency of the driving signal means that there is a variation in a frequency at which the liquid crystal panel is driven. In view of this, according to the liquid crystal display device in accordance with one aspect of the present invention, the frequency at which the capacitive touch sensor is scanned is changed to a predetermined frequency, so that correction is made so that the frequency at which the liquid crystal panel is driven and the frequency at which the capacitive touch sensor is scanned have the same variation.

In a case where there is a variation in the liquid crystal driving frequency, it becomes difficult to prevent the scanning frequency and the liquid crystal driving frequency from overlapping each other. That is, it becomes difficult to prevent a frequency of the liquid crystal driving noise and a noise frequency which is sensed by the capacitive touch sensor as a noise from overlapping each other. This increases a possibility that the liquid crystal driving noise is mixed into sensing of the touch panel. However, according to the liquid crystal display device in accordance with one aspect of the present invention, correction is made so that the frequency at which the liquid crystal panel is driven and the frequency at which the capacitive touch sensor is scanned have the same variation. Therefore, even in a case where the frequency of the liquid crystal driving noise shifts, the liquid crystal driving noise is scarcely mixed into the sensing. This makes it possible to avoid the mixing of the liquid crystal noise into the sensing, and thus makes it possible to prevent a decrease in recognition performance of the capacitive touch sensor caused by the mixing-in of the liquid crystal driving noise.

In order to attain the object, a liquid crystal display device in accordance with one aspect of the present invention is a liquid crystal display device including: a liquid crystal panel for displaying an image supplied from outside; a driving section for driving the liquid crystal panel in accordance with a driving signal; a capacitive touch sensor for detecting a change in capacitance, the capacitive touch panel being provided so as to overlap the liquid crystal panel; a control section for scanning the capacitive touch sensor in accordance with a reference clock signal which is generated by an oscillation circuit provided in the liquid crystal display device; a counting section for counting a frequency of the reference clock signal; a determining section for determining whether or not the frequency of the reference clock signal is a predetermined value; and a changing section for changing, in a case where the determining section determines that the frequency of the reference clock signal is not the predetermined value, a frequency at which the liquid crystal panel is driven.

According to the above configuration, in a case where there is a variation in the frequency of the reference clock signal of the capacitive touch sensor, the frequency at which the liquid crystal panel is driven is changed to a predetermined frequency. Note, here, that the touch sensor is scanned on the liquid crystal panel in accordance with the reference clock signal. Accordingly, having a variation in the frequency of the reference clock signal means that there is a variation in a frequency at which the capacitive touch sensor is scanned. In view of this, according to the liquid crystal display device in accordance with one aspect of the present invention, the frequency at which the liquid crystal panel is driven is changed to a predetermined frequency, so that correction is made so that the frequency at which the liquid crystal panel is driven and the frequency at which the capacitive touch sensor is scanned have the same variation.

In a case where there is a variation in the liquid crystal driving frequency, it becomes difficult to prevent the scanning frequency and the liquid crystal driving frequency from overlapping each other. That is, it becomes difficult to prevent a frequency of the liquid crystal driving noise and a noise frequency which is sensed by the capacitive touch sensor as a noise from overlapping each other. This increases a possibility that the liquid crystal driving noise is mixed into sensing of the touch panel. However, according to the liquid crystal display device in accordance with one aspect of the present invention, the correction is made so that the frequency at which the liquid crystal panel is driven and the frequency at which the capacitive touch sensor is scanned have the same variation. Therefore, even in a case where the frequency of the liquid crystal driving noise shifts, the liquid crystal driving noise is scarcely mixed into the sensing. This makes it possible to avoid the mixing of the liquid crystal noise into the sensing, and thus makes it possible to prevent a decrease in recognition performance of the capacitive touch sensor caused by the mixing-in of the liquid crystal driving noise.

In order to attain the object, a method for driving a liquid crystal display device in accordance with one aspect of the present invention is a method for driving a liquid crystal display device, the liquid crystal display device including: a liquid crystal panel for displaying an image supplied from outside; a driving section for driving the liquid crystal panel in accordance with a driving signal; a capacitive touch sensor for detecting a change in capacitance, the capacitive touch panel being provided so as to overlap the liquid crystal panel; and a control section for scanning the capacitive touch sensor in accordance with a frequency of a reference clock signal which is generated by an oscillation circuit provided in the liquid crystal display device, the method including the steps of: (a) counting a frequency of the driving signal; (b) determining whether or not the frequency of the driving signal is a predetermined value; and (c) changing, in a case where the frequency of the driving signal is determined not to be the predetermined value in the step (b), a frequency at which the capacitive touch sensor is scanned.

According to the above method, it is possible to provide a driving method which makes it possible to avoid mixing of a liquid crystal driving noise into sensing, and thus makes it possible to prevent a decrease in recognition performance of a touch sensor caused by the mixing-in of the liquid crystal driving noise.

In order to attain the object, a method for driving a liquid crystal display device in accordance with one aspect of the present invention is the method for driving the liquid crystal display device, the liquid crystal display device including: a liquid crystal panel for displaying an image supplied from outside; a driving section for driving the liquid crystal panel in accordance with a driving signal; a capacitive touch sensor for detecting a change in capacitance, the capacitive touch panel being provided so as to overlap the liquid crystal panel; and a control section for scanning the capacitive touch sensor in accordance with a frequency of a reference clock signal which is generated by an oscillation circuit provided in the liquid crystal display device, the method including the steps of: (a) counting a frequency of the reference clock signal; (b) determining whether or not the frequency of the reference clock signal is a predetermined value; and (c) changing, in a case where the frequency of the reference clock signal is determined not to be the predetermined value in the step (b), a frequency at which the liquid crystal panel is driven.

According to the above method, it is possible to provide a driving method which makes it possible to avoid mixing of a liquid crystal driving noise into sensing, and thus makes it possible to prevent a decrease in recognition performance of a touch sensor caused by the mixing-in of the liquid crystal driving noise.

Additional objects, features, and strengths of the present invention will be made clear by the description below. Further, the advantages of the present invention will be evident from the following explanation in reference to the drawings.

Advantageous Effects of Invention

According to a liquid crystal display device in accordance with the present invention, correction is made so that the frequency at which the liquid crystal panel is driven and the frequency at which the capacitive touch sensor is scanned have the same variation. Therefore, even in a case where the frequency of the liquid crystal driving noise shifts, the liquid crystal driving noise is scarcely mixed into the sensing. This makes it possible to avoid the mixing of the liquid crystal noise into the sensing, and thus makes it possible to prevent a decrease in recognition performance of the capacitive touch sensor caused by the mixing-in of the liquid crystal driving noise.

BRIEF DESCRIPTION OF DRAWINGS (a) of FIG. 1 is a block diagram illustrating a configuration of main parts of a liquid crystal display device in accordance with one embodiment of the present invention. (b) of FIG. 1 is a block diagram illustrating a configuration of main parts of a liquid crystal display device in accordance with another embodiment of the present invention.

DESCRIPTION OF EMBODIMENTS

The following describes an embodiment in accordance with the present invention. Although various preferable limitations are given in the following description in order to put the present invention to practice, the technical scope of the present invention is not limited to the following embodiment and drawings.

(Outline of Liquid Crystal Display Devices 1a and 1b)

Figure 2:
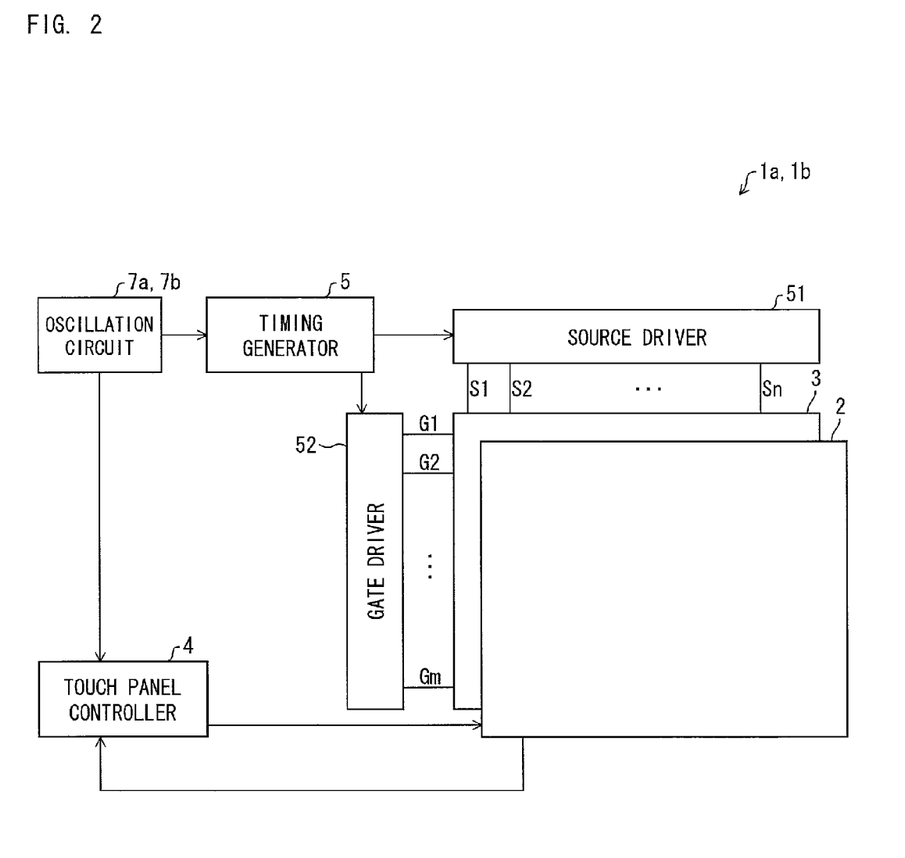
FIG. 2 is a view schematically illustrating a configuration of a liquid crystal display device in accordance with one embodiment of the present invention.

A liquid crystal display device in accordance with the present embodiment (i) includes a capacitive touch panel mounted on a liquid crystal panel, and (ii) is capable of avoiding mixing of a liquid crystal driving noise into sensing (scanning) of the touch panel. Before describing how to avoid the mixing-in of the liquid crystal driving noise, the following briefly describes, with reference to FIG. 2, an overall configuration of the liquid crystal display device in accordance with the present embodiment. FIG. 2 shows views schematically illustrating configurations of respective liquid crystal display devices 1a and 1b in accordance with the present embodiment.

The liquid crystal display devices 1a and 1b are each, for example, a display device included in a portable phone or the like, and includes a liquid crystal panel 3, a touch panel controller 4 (control section), a liquid crystal driving controller (timing generator) 5 (driving section), two oscillation circuits 7a and 7b. The liquid crystal panel 3 is provided with various circuits, and includes a source driver 51 and a gate driver 52. As described above, a touch panel 2 is mounted on the liquid crystal panel 3.

The source driver 51 (driving section) included in the liquid crystal panel 3 is a circuit for driving source lines S1, S2, . . . , and Sn. The gate driver 52 (driving section) included in the liquid crystal panel 3 is a circuit for driving gate lines G1, G2, . . . , and Gm. Various signals and image data are supplied to the liquid crystal panel 3. Specifically, the various driving signals for driving the liquid crystal panel 3 are supplied from the liquid crystal driving controller (timing generator) 5 to the source driver and the gate driver 52. The image data are supplied from the liquid crystal driving controller (timing generator) to the source driver 51 and the gate driver 52.

The liquid crystal driving controller (timing generator) 5 generates, in accordance with a reference clock signal CLK from the oscillation circuit 7a (internal oscillation circuit), and a horizontal synchronization signal Hsync and a vertical synchronization signal Vsync, each of which is supplied from outside, (i) a source clock signal SCK and a source start pulse SSPB, each of which is to be supplied to the source driver 51 and (ii) a gate clock signal GCK and a gate start pulse GSPB, each of which is to be supplied to the gate driver 52. The oscillation circuit 7a is supplied with a voltage from a power source (not shown) or the like of its corresponding liquid crystal display device 1a or 1b, and generates the reference clock signal CLK in accordance with the supplied voltage.

The liquid crystal driving controller (timing generator) 5 generates, in accordance with the image data supplied from outside, (i) a data signal to be supplied to the source driver 51 and (ii) a scanning signal to be supplied to the gate driver 52. The source driver 51 outputs the data signal to the source lines S1, S2, . . . , and Sn at a timing based on the source clock signal SCK and the source start pulse SSPB, each of which is supplied from the liquid crystal driving controller (timing generator) 5. Similarly, the gate driver 52 sequentially outputs the scanning signal to the gate lines G1, G2, . . . , and Gm, at a timing based on the gate clock signal GCK and the gate start pulse GSPB. Note that the term "outside" as used herein indicates a signal source such as a video device, a tuner, and the like. In each of the liquid crystal display devices 1a and 1b, a receiving section (not shown) (i) receives the horizontal synchronization signal Hsync, the vertical synchronization signal Vsync, the image data, and the like, each of which is supplied from the signal source, and (ii) supplies thus received signals to the liquid crystal driving controller (timing generator) 5, the source driver 51, the gate driver 52, and the like.

While the above operation is being carried out, the touch panel controller 4 carries out sensing of the touch panel 2 at a timing based on a signal generated in accordance with a reference clock signal CLK supplied from the oscillation circuit 7b (generating circuit). The oscillation circuit 7b is a circuit which is supplied with a voltage from a power source (not shown) or the like of its corresponding liquid crystal display device 1a or 1b, and generates the reference clock signal CLK in accordance with the supplied voltage so as to output the generated reference clock signal CLK. The touch panel controller 4 detects a change in capacitance on the touch panel 2 so as to determine a position touched by a user (this will be described later in detail). Each of the liquid crystal display devices 1a and 1b changes, in accordance with a result of the detection carried out by the touch panel controller 4, a display state of an image which is displayed on the liquid crystal panel 3.

As described above, the touch panel controller carries out sensing of the touch panel 2 at a timing based on a signal generated in accordance with a reference clock signal CLK supplied from the oscillation circuit 7b, whereas the source driver 51 and the gate driver 52 drive the liquid crystal panel at a timing based on signals (the source clock signal SCK, the gate clock signal GCK, the source start pulse SSPB, and the gate start pulse GSPB) generated by the liquid crystal driving controller (timing generator) 5 in accordance with a reference clock signal CLK. Therefore, it is desirable that a reference clock signal CLK outputted from the oscillation circuit 7a and a reference clock signal CLK outputted from the oscillation circuit 7b have such respective frequencies that a timing at which the touch panel 2 carries out sensing and a timing at which a noise is generated due to driving of the liquid crystal panel 3 do not overlap each other. The above-described frequencies, which make it possible that the timing at which the touch panel 2 carries out sensing and the timing at which a noise is generated due to driving of the liquid crystal panel 3 do not overlap each other, mean such frequencies that a noise frequency (hereinafter referred to as touch panel-sensed noise frequency) sensed by the touch panel 2 as a noise and a noise frequency (hereinafter referred to as liquid crystal noise frequency) generated due to driving of the liquid crystal panel 3 do not overlap each other. Note that the touch panel-sensed noise frequency means a frequency of a noise which is generated at a timing at which the touch panel 2 carries out sensing. In view of the above, the oscillation circuits 7a and 7b are previously set to output reference clock signals CLK whose respective frequencies satisfy the above conditions.

(Capacitive Touch Panel Operation Principle)

As described above, the touch panel 2 in accordance with the present embodiment is a capacitive touch panel. The following briefly describes an operation principle of the capacitive touch panel (Reference: descriptions and drawings of "Monthly DISPLAY 2009, December" Techno Times Co., Ltd.).

Figure 3:
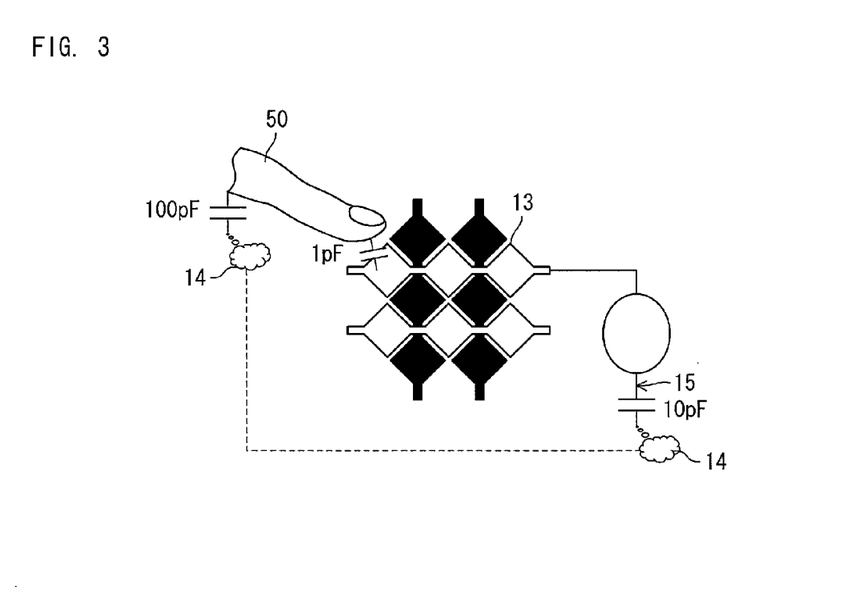
FIG. 3 is a view illustrating an equivalent circuit related to a capacitance between (i) a sensor of a touch panel included in a display device and (ii) a human finger.

The capacitive touch panel includes a touch sensor and operates by detecting a change which is caused in the touch sensor by a capacitance of a human finger. FIG. 3 illustrates an equivalent circuit related to a capacitance between (i) the touch sensor of a touch panel included in a display device and (ii) a human finger.

As illustrated in FIG. 3, a finger 50, which is a part of a human body, constitutes a closed loop via (i) a capacitance (approximately 100 pF) between a person and a ground 14 (or a grounded environment which is common to the display device and the person) and (ii) a capacitance (approximately 10 pF) between the display device and a ground 14. Note here that a capacitance between the finger 50 and a sensor 13 of the touch panel is approximately 1 pF. That is, when the finger 50 touches the touch panel, a change of 1 pF is caused by the finger 50 in a circuit in which 100 pF and 10 pF are connected in series. A touch panel controller 4 detects the change so as to recognize that the finger 50 has touched the touch panel.

A projection type capacitive touch panel is roughly classified into, with regard to how to detect a change in capacitance, (i) one which employs absolute capacitive sensing which is a method in which a capacitance is directly measured and (ii) one which employs transcapacitive sensing which is a method in which a pulse voltage is applied to an electrode of an x direction or to an electrode of a y direction, and an electric charge transmitted as a result of the application is measured. The former case is illustrated in FIG. 4, and the latter case is illustrated in FIG. 5.

Figure 4:
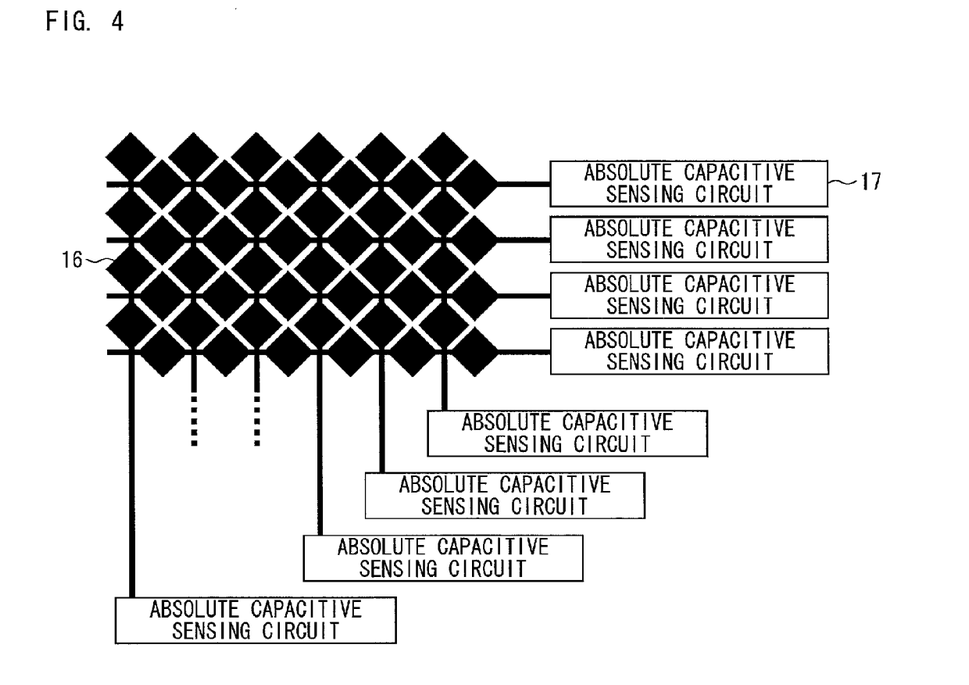
FIG. 4 is a view schematically illustrating absolute capacitive sensing.

As the absolute capacitive sensing of FIG. 4, various methods have been proposed and practically used. A dual ramp integral equation is described here as an example. A capacitance to be measured is charged with a constant electric current for a certain period of time (Q=constant). In a case where the capacitance to be measured is large, a voltage with which the capacitance is charged is low according to a theorem of Q=AC. In a case where, after measurement of a charging direction, the capacitance to be measured is fully charged with a specified voltage, an electric charge which has been charged is discharged with an equal electric current and for an equal period of time.

In a case where the capacitance is large, a residual voltage after the discharging has a high value (whereas an absolute value of a discharged voltage is low). An amount of change in voltage in a charging period and an amount of change in voltage in a discharging period are equal. Note that in a case where a common mode noise occurs in the charging period and/or the discharging period, the noise is canceled out, and in a case where a normal mode noise occurs in the charging period and/or the discharging period, the noise is averaged out and decreases.

Figure 5:
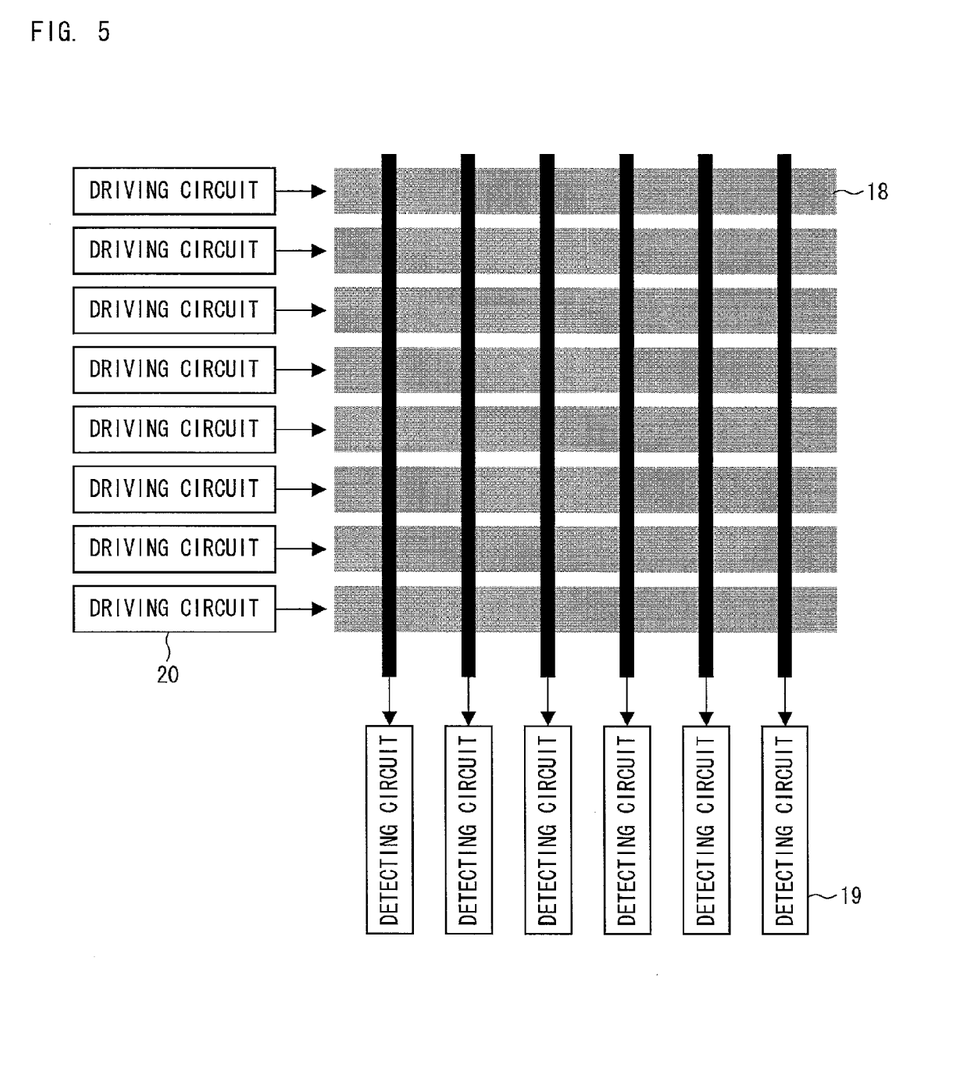
FIG. 5 is a view schematically illustrating transcapacitive sensing.
Figure 6:
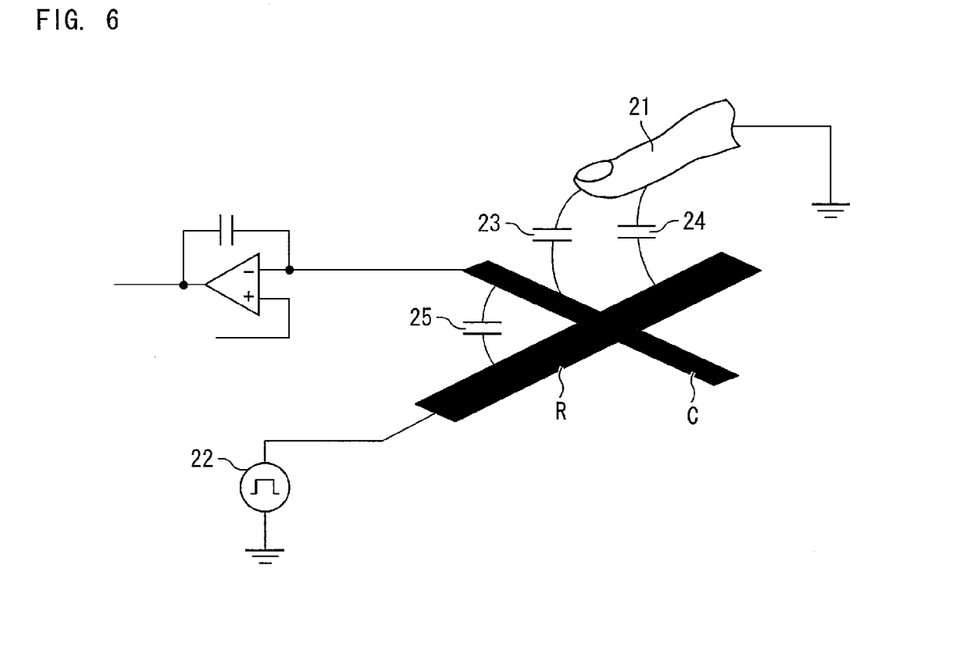
FIG. 6 is a view illustrating an equivalent circuit related to the transcapacitive sensing.

On the other hand, in the transcapacitive sensing of FIG. 5, a pulse is sequentially applied in one direction, and an electric charge which is induced in the other direction is measured. A more specific operation principle is illustrated in FIG. 6. In FIG. 6, the reference numeral 23 denotes a capacitance between a finger 21 and an electrode of a row direction R, the reference numeral 24 denotes a capacitance between the finger 21 and an electrode of a column direction C, the reference numeral 25 denotes a capacitance between the column direction C and the row direction R, and the reference numeral 22 denotes a low impedance transmitter.

As illustrated in FIG. 6, a touch panel detects a decrease, caused by a grounded finger, in amount of a pulse signal which is transmitted from a liquid crystal driver to a detecting circuit 19. In the transcapacitive sensing, a pattern of capacitance change obtained is similar to that of an image sensor since driving is carried out independently for each electrode.

Figure 7:
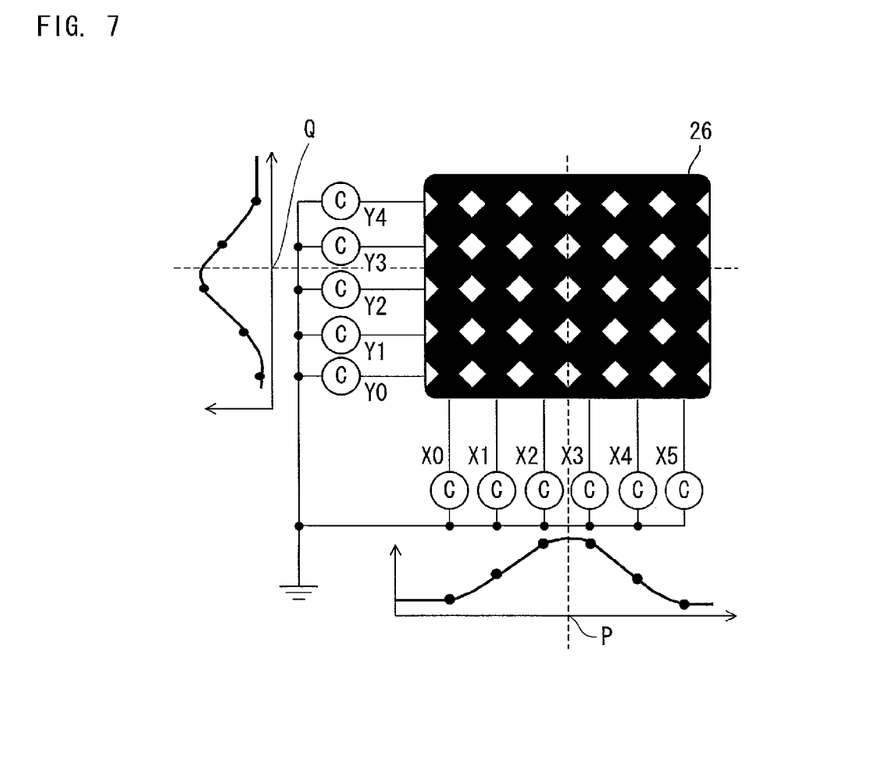
FIG. 7 is a view illustrating results of measurement carried out with respect to electrodes in the absolute capacitive sensing.

Next, results of measurement carried out with respect to electrodes in the absolute capacitive sensing illustrated in FIG. 4 are shown in FIG. 7. The results shown in FIG. 7 only indicate changes caused by a finger. In a case where a finger touches (presses) a point on a touch panel 26, mountain-shaped data (profile) centering on the point is obtained. In FIG. 7, data having its peak on a point P is obtained in an x direction, and data having its peak on a point Q is obtained in a y direction. In the absolute capacitive sensing, it is possible to calculate, based on each curve on the profile, a center position, a thickness, a width and the like of the finger. A pitch between sensors arranged in the x direction and a pitch between sensors arranged in the y direction are each a few mm. This makes it possible to obtain 500 dpi or more of a resolution of the finger position. In a case where a plurality of fingers touch the touch panel, data which indicates a plurality of peaks is obtained, and a position of each of the fingers can be detected.

Figure 8:
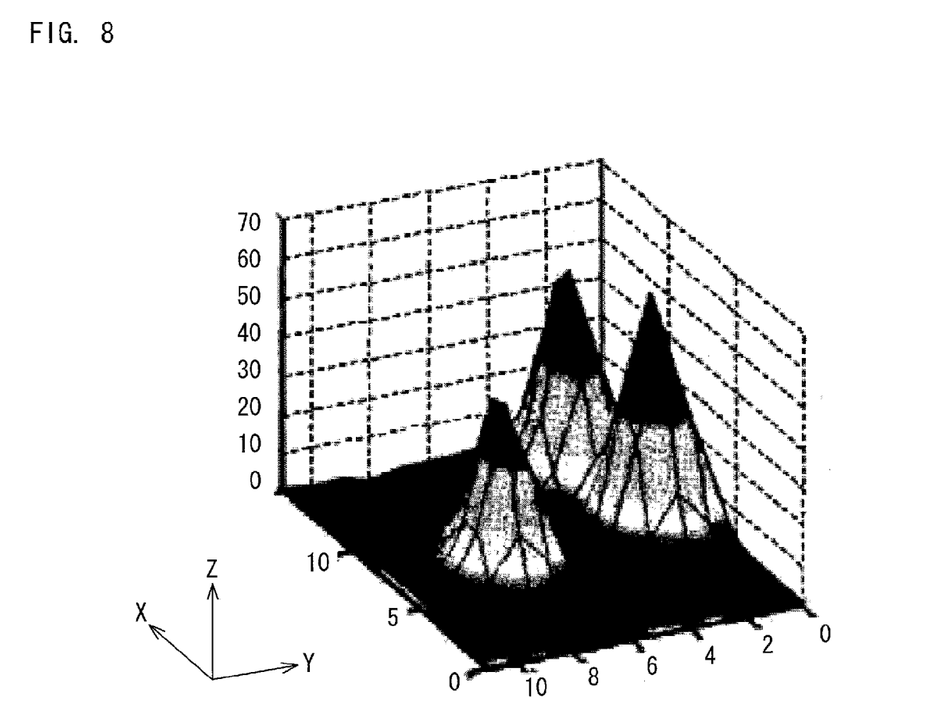
FIG. 8 is a view illustrating results of measurement carried out with respect to electrodes in the absolute capacitive sensing.

FIG. 8 shows a three dimensional graph of results of measurement carried out with respect to electrodes in the absolute capacitive sensing. In FIG. 8, a change in capacitance is indicated in a z-axis direction. The results shown in FIG. 8 correspond to a case where three fingers touch a touch panel. As illustrated in FIG. 8, mountain-shaped data (profiles), each centering on a point on which the touch panel is pressed by a finger, are obtained similarly as in FIG. 7. Based on the data, a center position and the like of each of the fingers can be calculated with a high resolution, similarly as in the case of FIG. 7.

The above description has discussed, with concrete illustration, the operation principle of the capacitive touch panel. Note, however, that a touch panel which is applicable to the liquid crystal display devices 1a and 1b of the present invention is not limited to the capacitive touch panel.

(Sensing 1 in which Mixing-in of Liquid Crystal Driving Noise is Avoided)

Figure 1:
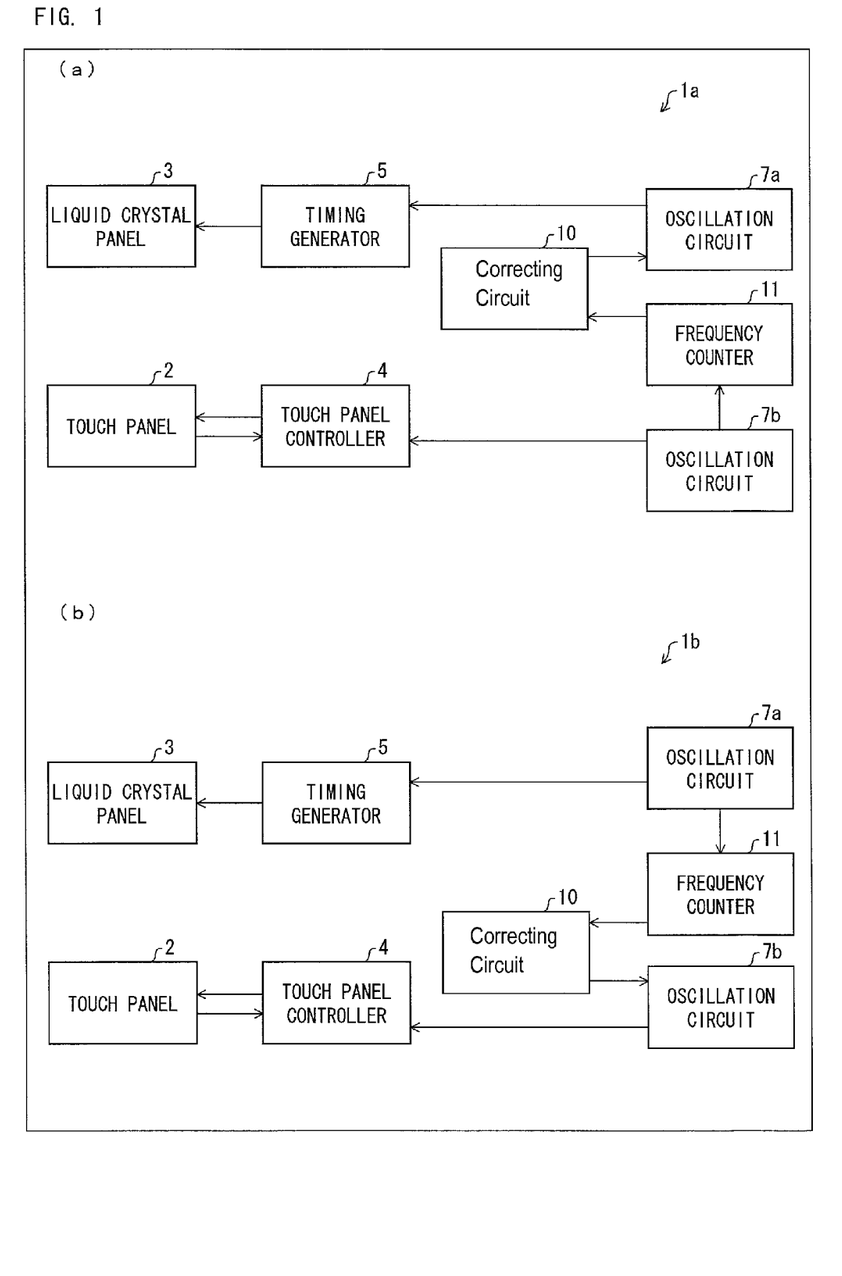

As described earlier, the touch panel controller carries out sensing of the touch panel 2 at a timing based on a reference clock signal CLK supplied from the oscillation circuit 7b. Meanwhile, the source driver 51 and the gate driver 52 drive the liquid crystal panel 3 at a timing based on (i) a dot clock signal DCLK generated in accordance with a reference clock signal CLK supplied from the oscillation circuit 7a, (ii) a horizontal synchronization signal Hsync, and (iii) a vertical synchronization signal Vsync. The liquid crystal display devices 1a and 1b in accordance with the present embodiment are each configured to include (i) a frequency counter (calculating section) for observing a frequency of a reference clock signal CLK of one of the two oscillation circuits 7a and 7b and (ii) a correcting circuit (determining section, changing section) for correcting, to a predetermined frequency, one of a liquid crystal driving frequency and a scanning frequency in accordance with information supplied from the frequency counter. This configuration is employed for the following reason. Since the touch panel-sensed noise frequency depends on the scanning frequency and the liquid crystal driving noise frequency depends on the liquid crystal driving frequency, correction of one of the liquid crystal driving frequency and the scanning frequency makes it possible to prevent the touch panel-sensed noise frequency and the liquid crystal driving noise frequency from overlapping each other. This will be described with reference to FIG. 1. FIG. 1 shows block diagrams illustrating configurations of main parts of the respective liquid crystal display devices 1a and 1b in accordance with the present embodiment.

The correcting circuit may correct either one of the liquid crystal driving frequency and the scanning frequency. The following description describes, in this order, (i) a case where the correcting circuit corrects the liquid crystal driving frequency and (ii) a case where the correcting circuit corrects the scanning frequency.

First, in the case where the correcting circuit corrects the liquid crystal driving frequency, the correcting circuit corrects the liquid crystal driving frequency by a rate which is equal to a rate by which the reference clock signal CLK supplied from the oscillation circuit 7b shifts. Specifically, as illustrated in (a) of FIG. 1, the frequency counter 11 observes the reference clock signal CLK supplied from the oscillation circuit 7b. More specifically, the reference clock signal CLK supplied from the oscillation circuit 7b is outputted to the touch panel controller 4 and the frequency counter 11, and then the frequency counter 11 counts a frequency of the reference frequency signal CLK supplied from the oscillation circuit 7b. Then, information of the frequency counted by the frequency counter 11 is outputted to the correcting circuit 10. The correcting circuit 10 checks, in accordance with the information supplied from the frequency counter 11, whether the frequency of the reference clock signal CLK supplied from the oscillation circuit 7b is a predetermined frequency.

Note that the touch panel controller 4 carries out sensing of the touch panel 2 at a timing based on a signal generated in accordance with the reference clock signal CLK supplied from the oscillation circuit 7b. As such, having a variation in the frequency of the reference clock signal CLK outputted from the oscillation circuit 7b to the touch panel controller 4 means that there is a variation in the scanning frequency.

In view of this, in a case where the frequency of the reference clock signal CLK supplied from the oscillation circuit 7b is below or above the predetermined frequency and therefore has a variation, the correcting circuit 10 determines that it is necessary to correct the liquid crystal driving frequency. Note that the source driver 51 and the gate driver 52 drive the liquid crystal panel 3 at a timing based on signals (a source clock signal SCK, a gate clock signal GCK, a source start pulse SSPB, and a gate start pulse GSPB) which are generated by the liquid crystal driving controller (timing generator) 5 in accordance with the reference clock signal CLK supplied from the oscillation circuit 7a. Therefore, it is possible to correct the liquid crystal driving frequency by correcting the frequency of the reference clock signal supplied from the oscillation circuit 7a.

In view of this, in the case where the correcting circuit 10 determines that it is necessary to correct the liquid crystal driving frequency, the correcting circuit 10 controls, in accordance with the information supplied from the frequency counter 11, the oscillation circuit 7a to output a reference clock signal CLK having a predetermined frequency in accordance with a shift of the frequency of the reference clock signal CLK supplied from the oscillation circuit 7b.

A specific method in which the correcting circuit 10 makes correction can be such that, for example, a prescaler (not shown) is provided in the oscillation circuit 7a, and the correcting circuit 10 changes a frequency division ratio of the prescaler to a predetermined frequency division ratio to thereby adjust the frequency of the reference clock signal CLK outputted from the oscillation circuit 7a. The prescaler is a frequency division circuit which is capable of outputting a signal obtained by dividing the frequency of the reference clock signal outputted from the oscillation circuit 7a at a given frequency division ratio. That is, the prescaler is a circuit which is capable of outputting, to the liquid crystal driving controller (timing generator) 5, a signal having a frequency obtained by dividing the frequency of the reference clock signal CLK outputted from the oscillation circuit 7a by a given integer. Note that, for example, (i) a frequency reference value which is used in determining whether or not it is necessary to correct the liquid crystal driving frequency, and (ii) an amount of correction of a frequency of a reference clock signal CLK (for example, an amount of change to be made to a frequency division ratio of the prescaler in accordance with a shift of a frequency of a reference clock signal CLK supplied from the oscillation circuit 7b) are stored in advance in the correcting circuit 10.

Alternatively, the correcting circuit 10 can also be configured to directly adjust a frequency of the reference clock signal CLK outputted from the oscillation circuit 7a. For example, by changing a voltage supplied to the oscillation circuit 7a to a predetermined voltage, the collecting circuit 10 can adjust the frequency of the reference clock signal CLK outputted from the oscillation circuit 7a. Accordingly, although (a) of FIG. 1 shows a configuration in which the correcting circuit 10 directly controls the oscillation circuit 7a, it is possible to employ a configuration in which the correcting circuit 10 indirectly controls the oscillation circuit 7a by controlling a power source section (not shown). Note that, for example, (i) a frequency reference value which is used in determining whether or not it is necessary to correct the liquid crystal driving frequency and (ii) an amount of correction of a frequency of the reference clock signal CLK supplied from the oscillation circuit 7a (for example, an amount of change to be made, to a voltage supplied to the oscillation circuit 7a, in accordance with a shift of a frequency of the reference clock signal CLK supplied from the oscillation circuit 7b) are stored in advance in the correcting circuit 10.

(Sensing 2 in which Mixing-in of Liquid Crystal Driving Noise is Avoided)

On the other hand, in the case where the correcting circuit 10 corrects a scanning frequency, the correcting circuit 10 corrects the scanning frequency by a rate which is equal to a rate by which a liquid crystal driving frequency shifts. Specifically, as illustrated in (b) of FIG. 1, the frequency counter 11 observes a reference clock signal CLK supplied from the oscillation circuit 7a. A specific method in which correction is made is the same as in the case of correcting the liquid crystal driving frequency. That is, the reference clock signal CLK supplied from the oscillation circuit 7a is outputted to the liquid crystal driving controller (timing generator) 5 and the frequency counter 11, and then the frequency counter 11 counts the frequency of the reference frequency signal CLK supplied from the oscillation circuit 7a. Then, information of the frequency counted by the frequency counter 11 is outputted to the correcting circuit 10. The correcting circuit 10 checks, in accordance with the information supplied from the frequency counter 11, whether the frequency of the reference clock signal CLK supplied from the oscillation circuit 7a is a predetermined frequency.

Note that the source driver 51 and the gate driver 52 drive the liquid crystal panel 3 at a timing based on signals (a source clock signal SCK, a gate clock signal GCK, a source start pulse SSPB, and a gate start pulse GSPB) which are generated by the liquid crystal driving controller (timing generator) 5 in accordance with the reference clock signal CLK supplied from the oscillation circuit 7a. As such, having a variation in the frequency of the reference clock signal CLK outputted from the oscillation circuit 7a to the liquid crystal driving controller (timing generator) 5 means that there is a variation in the liquid crystal driving frequency.

In view of this, in a case where the frequency of the reference clock signal CLK supplied from the oscillation circuit 7a is below or above the predetermined frequency and therefore has a variation, the correcting circuit 10 determines that it is necessary to correct the scanning frequency. Note that the touch panel controller 4 carries out sensing of the touch panel 2 at a timing based on the reference clock signal CLK supplied from the oscillation circuit 7b. Therefore, it is possible to correct the scanning frequency by correcting the frequency of the reference clock signal CLK outputted to the touch panel controller 4.

In view of this, in the case where the correcting circuit 10 determines that it is necessary to correct the scanning frequency, the correcting circuit 10 controls, in accordance with the information supplied from the frequency counter 11, the oscillation circuit 7b to output a reference frequency signal CLK having a predetermined frequency in accordance with a shift of the frequency of the reference clock signal CLK supplied from the oscillation circuit 7a.

A specific method in which the correcting circuit 10 makes correction can be such that, for example, a prescaler (not shown) is provided in the oscillation circuit 7b, and the correcting circuit 10 changes a frequency division ratio of the prescaler to a predetermined frequency division ratio to thereby adjust the frequency of the reference clock signal CLK outputted from the oscillation circuit 7b. The prescaler is a frequency division circuit which is capable of outputting a signal obtained by dividing the frequency of the reference clock signal outputted from the oscillation circuit 7b at a given frequency division ratio. That is, the prescaler is a circuit which is capable of outputting, to the touch panel controller 4, a signal having a frequency obtained by dividing the frequency of the reference clock signal CLK outputted from the oscillation circuit 7b by a given integer. Note that, for example, (i) a frequency reference value which is used in determining whether or not it is necessary to correct the liquid crystal driving frequency, and (ii) an amount of correction of a frequency of a reference clock signal CLK (for example, an amount of change to be made to a frequency division ratio of the prescaler in accordance with a shift of a frequency of a reference clock signal CLK supplied from the oscillation circuit 7a) are stored in advance in the correcting circuit 10.

Alternatively, the correcting circuit 10 can also be configured to directly adjust a frequency of the reference clock signal CLK outputted from the oscillation circuit 7b. For example, by changing a voltage supplied to the oscillation circuit 7b to a predetermined voltage, the collecting circuit 10 can adjust the frequency of the reference clock signal CLK outputted from the oscillation circuit 7b. Accordingly, although (b) of FIG. 1 shows a configuration in which the correcting circuit 10 directly controls the oscillation circuit 7b, it is possible to employ a configuration in which the correcting circuit 10 indirectly controls the oscillation circuit 7b by controlling a power source section (not shown). In this case, an amount of correction of a frequency of the reference clock signal CLK supplied from the oscillation circuit 7b (for example, an amount of change to be made, to a voltage supplied to the oscillation circuit 7b, in accordance with a shift of a frequency of the reference clock signal CLK supplied from the oscillation circuit 7a) is stored in advance in the correcting circuit 10.

The above description has discussed a configuration in which (i) a frequency of one of the reference clock signals CLK of the respective oscillation circuits 7a and 7b is observed, and (ii) a frequency of the other of the reference clock signals of the respective oscillation circuits 7a and 7b is corrected. Note, however, that the present embodiment is not necessarily limited to this. For example, it is also possible to employ a configuration in which the frequency counter 11 observes both the reference clock signals CLK of the respective oscillation circuits 7a and 7b so as to calculate a difference between the frequencies of the respective reference clock signals CLK. Then, in a case where the difference between the frequencies of the respective reference clock signals CLK is not a predetermined difference, the correcting circuit 10 may correct a liquid crystal driving frequency and/or a scanning frequency.

(Advantageous Effects)

As described above, the liquid crystal display device 1b in accordance with the present embodiment is arranged such that, in a case where there is a variation in the liquid crystal driving frequency, the scanning frequency is corrected in accordance with the variation. On the other hand, the liquid crystal display device 1a in accordance with the present embodiment is arranged such that, in a case where there is a variation in the scanning frequency, the liquid crystal frequency is corrected in accordance with the variation. That is, in both cases, correction is made so that the liquid crystal driving frequency and the scanning frequency have the same variation.

In a case where there is a variation in the liquid crystal driving frequency, it is difficult to prevent the scanning frequency and the liquid crystal driving frequency from overlapping each other. In other words, in a case where the liquid crystal driving noise frequency and the touch panel-sensed noise frequency overlap each other, there is an increased possibility that a liquid crystal driving noise is mixed into sensing of the touch panel 2. In the liquid crystal display devices 1a and 1b in accordance with the present embodiment, however, correction is made so that the liquid crystal driving noise frequency and the touch panel-sensed frequency have the same variation. Therefore, even in a case where the liquid crystal noise frequency shifts, the liquid crystal driving noise is scarcely mixed into the sensing. This makes it possible to avoid the mixing of the liquid crystal noise into the sensing, and thus makes it possible to prevent a decrease in recognition performance of the touch panel 2 caused by the mixing-in of the liquid crystal driving noise.

(Modified Example)

The above description has discussed a configuration in which the reference clock signal CLK of the oscillation circuit 7a is observed or corrected. Note, however, that the present invention is not necessarily limited to this. For example, advantageous effects of the present invention can be obtained also by observing or correcting signals (a horizontal synchronization signal Hsync, a vertical synchronization signal Vsync, a source start pulse SSPB, a gate start pulse GSPB, and the like) which are used in driving the liquid crystal panel 3. This is briefly described below.

As described above, instead of the reference clock signal CLK of the oscillation circuit 7a, synchronization signals such as the horizontal synchronization signal Hsync, the vertical synchronization signal Vsync, the source start pulse SSPB, the gate start pulse GSPB, and the like can be objects to be observed or corrected. For example, it is possible to employ a configuration in which the frequency counter 11 observes any one of the horizontal synchronization signal Hsync, the vertical synchronization signal Vsync, the source start pulse SSPB, and the gate start pulse GSPB, and the correcting circuit 10 determines, in accordance with information obtained by the observation, whether or not it is necessary to correct a frequency of the reference clock signal CLK supplied from the oscillation circuit 7b.

Alternatively, it is possible to employ a configuration in which the frequency counter 11 observes the frequency of the reference clock signal CLK supplied from the oscillation circuit 7b, and the correcting circuit 10 corrects, in accordance with information obtained by the observation, any one of the horizontal synchronization signal Hsync, the vertical synchronization signal Vsync, the source start pulse SSPB, and the gate start pulse GSPB to a predetermined frequency.

A specific method in which correction is made by the correcting circuit 10 can be such that, for example, in a case where the correcting circuit 10 corrects the horizontal synchronization signal Hsync, the correcting circuit 10 can adjust a frequency of the horizontal synchronization signal Hsync by increasing or decreasing a clock frequency which serves as a reference (for example, a frequency of the reference clock signal CLK, the dot clock signal DCLK, or the like). In a case where the correcting circuit 10 corrects the vertical synchronization signal Vsync, the correcting circuit can adjust a frequency of the vertical synchronization signal Vsync by increasing or decreasing the number of clock(s) which serve(s) as a reference (for example, the number of the horizontal synchronization signal(s) Hsync or the like). Therefore, the correcting circuit 10 can adjust the liquid crystal driving frequency by (i) adjusting a frequency of one of the reference clock signal CLK and the dot clock signal DCLK or (ii) controlling the number of the horizontal synchronization signal(s) Hsync. A specific method in which the frequency of the dot clock signal DCLK is corrected can be such that, for example, as in the case of the above described reference clock signal CLK, a prescaler is provided in a circuit which generates the dot clock signal DCLK, and the correcting circuit 10 adjusts the frequency of the dot clock signal DCLK by changing, to a predetermined frequency division ratio, a frequency division ratio of the prescaler in accordance with a shift of the frequency of the dot clock signal DCLK. In a case of correcting the number of the horizontal synchronization signal(s) Hsync, the correcting circuit 10 can correct the number of the horizontal synchronization signal(s) Hsync by controlling the number of the dot clock signal(s) DCLK.

The source driver 51 and the gate driver 52 drive the liquid crystal panel 3 at a timing based on (i) the reference clock signal CLK supplied from the oscillation circuit 7a, (ii) the horizontal synchronization signal Hsync, and (iii) the vertical synchronization signal Vsync. To be precise, the source driver 51 and the gate driver 52 drive the liquid crystal panel 3 at a timing based on signals (the source clock signal SCK, the gate clock signal GCK, the source start pulse SSPB, and the gate start pulse GSPB) generated by the liquid crystal driving controller (timing generator) 5 in accordance with the reference clock signal CLK, the horizontal synchronization signal Hsync, and the vertical synchronization signal Vsync. As such, having a variation in frequencies of the horizontal synchronization signal Hsync, the vertical synchronization signal Vsync, the source start pulse SSPB, and the gate start pulse GSPB means that there is a variation in a frequency at which the liquid crystal panel 3 is driven. Therefore, by (i) observing a frequency of any one of the horizontal synchronization signal Hsync, the vertical synchronization signal Vsync, the source start pulse SSPB, and the gate start pulse GSPB and (ii) correcting, in accordance with a result of the observation, a frequency division ratio of the oscillation circuit 7b or the frequency of the reference clock signal CLK, it is possible to make correction so that the frequency of the liquid crystal driving noise and the frequency of the touch panel-sensed noise have the same variation. By contrast, by (i) observing the frequency of the reference clock signal CLK supplied from the oscillation circuit 7b and (ii) correcting, in accordance with a result of the observation, a frequency of any one of the horizontal synchronization signal Hsync, the vertical synchronization signal Vsync, the source start pulse SSPB, and the gate start pulse GSPB (to be precise, a frequency of one of the reference clock signal CLK and the dot clock signal DCLK, or the number of the horizontal synchronization signal(s) Hsync) to a predetermined number, it is possible to make correction so that the frequency of the liquid crystal driving noise and the frequency of the touch panel-sensed noise have the same variation. That is, it is possible to avoid mixing of the liquid crystal driving noise into sensing, and thus avoid deterioration in recognition performance of the touch panel 2 caused by the mixing-in of the liquid crystal driving noise.

Note that a generated liquid crystal driving noise varies depending on a driving method (line inversion driving, dot inversion driving, or the like) of the liquid crystal display devices 1a and 1b. Therefore, a signal to be observed or corrected may be selected appropriately in consideration of the driving method of the liquid crystal display devices 1a and 1b. This makes it possible to avoid a liquid crystal noise of any liquid crystal display device.

The following describes a specific example of correction carried out by the correcting circuit 10. For example, in a case where the correcting circuit 10 corrects a frequency of a reference clock signal CLK, an amount of change of (i) a voltage applied to the oscillation circuits 7a and 7b or (ii) a frequency division ratio of a prescaler is preset, which amount allows the frequency of the reference clock signal CLK to be changed at a rate of 1%. Note that, since a variation caused in a general oscillation circuit due to a temperature difference or an individual difference is ±8 to 10%, it is sufficient to set the amount of change so that the frequency of the reference clock signal CLK can be changed at a rate of 1% and up to ±16%. Under this setting, it is possible to correct the frequency of the reference clock signal CLK at a rate of 1% by changing the voltage or the frequency division ratio by the preset amount of change every time the reference clock signal CLK is to be shifted by 1%. Note that application of a voltage to the oscillation circuits 7a and 7b so as to change the frequency of the reference clock signal CLK by 1% is realized by, for example, (i) providing, in the oscillation circuits 7a and 7b, an RC delay circuit in which a resistor R and a capacitor C are connected in parallel and (ii) controlling a voltage V of the RC delay circuit in accordance with the following relational expression (1) to thereby adjust the frequency of the reference clock signal CLK.

$$V(t)=V \times \exp(-t/\tau) \quad (1)$$

where V(t) is a voltage applied to the resistor R, V is an input voltage, t is time, and τ is a time constant.

For example, in a case where V=3.3 V, R=1 MΩ, and C=10 PF, time t which is required until a node A located between the resister R and the condenser C has a voltage of 1.65 V is calculated as follows. According to the relational expression (1), $$\tau=RC.$$

Therefore, $$t=6.9315 \times 10-6(s) \quad (2).$$

In the above setting, a voltage V which is required in time T for shifting the frequency of the reference clock signal CLK by 1%, that is, time T which is equivalent to 99% of t, is calculated as follows. According to the relational expression (1), $$V=V(t)/\exp(-T/\tau).$$

According to the expression (2), $$T=t \times 0.99=6.9315 \times 0.99.$$

Therefore, $$V \approx 3.277$$

That is, a voltage set as the voltage V for shifting the frequency of the reference clock signal CLK by 1% is 3.277 V. In this manner, the voltage which needs to be applied to the oscillation circuits 7a and 7b in order to correct the frequency of the reference clock signal CLK by 1% can be appropriately calculated in accordance with the relational expression (1).

As to a frequency division ratio of the prescaler which frequency division ratio allows the frequency of the reference clock signal CLK to be changed by 1%, for example, it is possible to correct the frequency of the reference clock signal CLK by 0.78% by multiplying the frequency of the reference clock signal CLK by 128 to obtain a source frequency and dividing the source frequency by 128. The example in which the frequency of the reference clock signal CLK is corrected by 0.78% is given here because setting the frequency division ratio to a power of 2 makes it possible to simplify the prescaler circuit. The frequency division ratio of the prescaler is therefore not necessarily limited to this, and can be a frequency division ratio that allows the reference clock signal CLK to be corrected by 1%.

On the other hand, in a case where (i) the frequency counter 11 observes a frequency of any one of a reference clock signal CLK of a liquid crystal panel, a horizontal synchronization signal Hsync, a vertical synchronization signal Vsync, a source clock signal SCK, a gate clock signal GCK, a source start pulse SSPB, and a gate start pulse GSPB and (ii) the frequency of the reference clock signal CLK of the oscillation circuit 7b is corrected, the frequency of the reference clock signal CLK may be shifted by a rate equal to a rate by which a frequency to be observed shifts. Therefore, in a case where a frequency of any one of the above signals shifts by 1%, the frequency of the reference clock signal CLK may be shifted by the same rate of 1%.

The above description also applies to a frequency of the dot clock signal DCLK and the number of the dot clock signal(s) DCLK. For example, in a case where the frequency of the dot clock signal DCLK is adjusted, an amount of change of a frequency division ratio of a prescaler is preset which amount allows the frequency of the dot clock signal DCLK to be changed at a rate of 1%. As to a frequency division ratio of the prescaler which frequency division ratio allows the frequency of the dot clock signal DCLK to be changed by 1%, as in the above-described case where the frequency of the reference clock signal CLK is adjusted, it is possible to, for example, correct the frequency of the dot clock signal DCLK by 0.78% by (i) multiplying the frequency of the dot clock signal DCLK by 128 to obtain a source frequency and (ii) dividing the source frequency by 128. The example in which the frequency of the dot clock signal DCLK is corrected by 0.78% is given here because setting the frequency division ratio to a power of 2 allows the prescaler circuit to be simplified. The frequency division ratio of the prescaler is therefore not necessarily limited to this.

A case in which the number of the dot clock signal(s) DCLK is adjusted is similar to the above-described case in which the frequency of the reference clock signal CLK is adjusted. For example, it is possible to adjust the number of the dot clock signal(s) DCLK by (i) providing, in a circuit for generating the dot clock signal DCLK(s), an RC delay circuit in which a register R and a capacitor C are connected in parallel and (ii) controlling a voltage V of the RC delay circuit in accordance with the above relational expression (1).

On the other hand, in a case where (i) the frequency counter 11 observes the reference clock signal CLK of the oscillation circuit 7b and (ii) the frequency of the dot clock signal DCLK or the number of the dot clock signal(s) DCLK is corrected, the frequency of the dot clock signal DCLK may be shifted by a rate equal to a rate by which the frequency of the reference clock signal CLK to be observed shifts. Therefore, in a case where the frequency of the dot clock signal DCLK of the oscillation circuit 7b shifts by 1%, the frequency of the dot clock signal DCLK may be shifted by the same rate of 1%.

The present invention is not limited to the foregoing embodiments, but rather can be applied in many variations within the scope of the claims. That is, a new embodiment obtained from a proper combination of technical means within the scope of the claims is also included in technical scope of the present invention.

[Summary of Embodiments]

As described above, a liquid crystal display device in accordance with one aspect of the present invention is configured such that: the oscillation circuit includes (i) a generating circuit for generating a signal having a predetermined frequency and (ii) a frequency dividing circuit for outputting, as the reference clock signal, a signal obtained by dividing the predetermined frequency of the signal at a given frequency division ratio; and the changing section changes the frequency division ratio of the frequency dividing circuit to a predetermined frequency division ratio so as to change a frequency of the reference clock signal to a predetermined frequency, thereby changing the frequency at which the capacitive touch sensor is scanned.

The liquid crystal display device in accordance with one aspect of the present invention further includes a power source section for supplying a voltage, wherein: the oscillation circuit generates the reference clock signal in accordance with the voltage supplied from the power source section; and the changing section changes the voltage, which is supplied from the power source section to the oscillation circuit, to a predetermined voltage so as to change a frequency of the reference clock signal to a predetermined frequency, thereby changing, to a predetermined frequency, the frequency at which the capacitive touch sensor is scanned.

According to the above configuration, it is possible to change, in accordance with a variation caused in a frequency at which a liquid crystal panel is driven, the frequency at which the capacitive touch sensor is scanned.

The liquid crystal display device in accordance with one aspect of the present invention is configured such that: the counting section counts a frequency of any one of a clock signal, a horizontal synchronization signal, a vertical synchronization signal, a source clock signal, a gate clock signal, a source start pulse, and a gate start pulse, each of which serves as the driving signal.

According to the above configuration, it is possible to determine, by counting the driving signal, whether or not there is a variation in a frequency at which the liquid crystal panel is driven.

The liquid crystal display device in accordance with one aspect of the present invention further includes a receiving section for receiving, as the driving signal, a horizontal synchronization signal and a dot clock signal from outside, wherein the changing section changes a frequency of one of the horizontal synchronization signal and the dot clock signal, which are outputted from the receiving section to the driving section, to a predetermined number to thereby change, to a predetermined frequency, the frequency at which the liquid crystal panel is driven.

The liquid crystal display device in accordance with one aspect of the present invention is configured such that: the driving section includes an internal oscillation circuit including (i) a generation circuit for generating a signal having a predetermined frequency and (ii) a frequency dividing circuit for outputting, as the driving signal, a clock signal obtained by dividing the predetermined frequency of the signal at a given frequency division ratio; and the changing section changes the frequency division ratio of the frequency dividing circuit to a predetermined frequency division ratio so as to change a frequency of the clock signal to a predetermined frequency, thereby changing, to a predetermined frequency, the frequency at which the liquid crystal panel is driven.

The liquid crystal display device in accordance with one aspect of the present invention further includes a power source section for supplying a voltage, wherein: the driving section includes an internal oscillation circuit for generating, as the driving signal, a clock signal in accordance with the voltage supplied from the power source section; and the changing section changes the voltage, which is supplied from the power source section to the internal oscillation circuit, to a predetermined voltage so as to change a frequency of the clock signal to a predetermined frequency, thereby changing the frequency at which the liquid crystal panel is driven.

According to the above configuration, it is possible to change, in accordance with a variation caused in a frequency at which the capacitive touch sensor is scanned, the frequency at which the liquid crystal panel is driven.

The embodiments or examples described in the foregoing detailed description of the invention serve solely to illustrate the technical details of the present invention, which should not be narrowly interpreted within the limits of such embodiments and concrete examples, but rather can be applied within the spirit of the present invention, provided such variations do not exceed the scope of the patent claims set forth below.

INDUSTRIAL APPLICABILITY

The present invention can be suitably applied to a display device such as a portable phone, a personal digital assistant (PDA), a portable game player, a personal computer, and the like, in each of which a display screen is equipped with a touch panel.

REFERENCE SIGNS LIST 1a, 1b, 30 Liquid crystal display device
2 Touch panel
3 Liquid crystal panel
4 Touch panel controller
5 Timing generator
7a, 7b Oscillation circuit
10 Correcting circuit
11 Frequency counter

The invention claimed is:
1. A liquid crystal display device comprising:
a liquid crystal panel configured to display an image supplied from outside;
a timing generator configured or programmed to drive the liquid crystal panel in accordance with a driving signal;
a capacitive touch sensor configured to detect a change in capacitance, the capacitive touch panel being provided so as to overlap the liquid crystal panel;
a touch panel controller configured or programmed to scan the capacitive touch sensor in accordance with a reference clock signal which is generated by an oscillation circuit provided in the liquid crystal display device;
a frequency counter configured or programmed to count a frequency of the driving signal;
a correcting circuit configured or programmed to determine whether or not the frequency of the driving signal is a predetermined value; and the correcting circuit configured or programmed to change, in a case where the correcting circuit determines that the frequency of the driving signal is not the predetermined value, a frequency at which the capacitive touch sensor is scanned.

2. The liquid crystal display device as set forth in claim 1, wherein:
the oscillation circuit includes (i) a generating circuit configured or programmed to generate a signal having a predetermined frequency and (ii) a frequency dividing circuit configured or programmed to output, as the reference clock signal, a signal obtained by dividing the predetermined frequency of the signal at a given frequency division ratio; and
the correcting circuit is configured or programmed to change the frequency division ratio of the frequency dividing circuit to a predetermined frequency division ratio so as to change a frequency of the reference clock signal to a predetermined frequency, thereby changing, to a predetermined frequency, the frequency at which the capacitive touch sensor is scanned.

3. A liquid crystal display device as set forth in claim 1, further comprising a power source configured to supply a voltage, wherein:
the oscillation circuit is configured or programmed to generate the reference clock signal in accordance with the voltage supplied from the power source; and
the correcting circuit is configured or programmed to change the voltage, which is supplied from the power source to the oscillation circuit, to a predetermined voltage so as to change a frequency of the reference clock signal to a predetermined frequency, thereby changing, to a predetermined frequency, the frequency at which the capacitive touch sensor is scanned.

4. The liquid crystal display device as set forth in claim 1, wherein:
the frequency counter is configured or programmed to count a frequency of any one of a clock signal, a horizontal synchronization signal, a vertical synchronization signal, a source clock signal, a gate clock signal, a source start pulse, and a gate start pulse, each of which serves as the driving signal.

5. A liquid crystal display device comprising:
a liquid crystal panel configured to display an image supplied from outside;
a timing generator configured or programmed to drive the liquid crystal panel in accordance with a driving signal;
a capacitive touch sensor configured to detect a change in capacitance, the capacitive touch panel being provided so as to overlap the liquid crystal panel;
a touch panel controller configured or programmed to scan the capacitive touch sensor in accordance with a reference clock signal which is generated by an oscillation circuit provided in the liquid crystal display device;
a frequency counter configured or programmed to count a frequency of the reference clock signal;
the correcting circuit configured or programmed to determine whether or not the frequency of the reference clock signal is a predetermined value; and
the correcting circuit configured or programmed to change, in a case where the correcting circuit determines that the frequency of the reference clock signal is not the predetermined value, a frequency at which the liquid crystal panel is driven.

6. A liquid crystal display device as set forth in claim 5, further comprising a receiving circuit configured to receive, as the driving signal, a dot clock signal(s) from outside, wherein:
the correcting circuit is configured or programmed to change, to a predetermined number, (i) the number of the dot clock signal(s) outputted from the receiving circuit to the timing generator or (ii) a frequency of each of the dot clock signal(s), thereby changing, to a predetermined frequency, the frequency of the driving signal at which the liquid crystal panel is driven.

7. The liquid crystal display device as set forth in claim 5, wherein:
the timing generator includes an internal oscillation circuit including (i) a generation circuit configured or programmed to generate a signal having a predetermined frequency and (ii) a frequency dividing circuit configured or programmed to output, as the driving signal, a clock signal obtained by dividing the predetermined frequency of the signal at a given frequency division ratio; and
the correcting circuit is configured or programmed to change the frequency division ratio of the frequency dividing circuit to a predetermined frequency division ratio so as to change a frequency of the clock signal to a predetermined frequency, thereby changing, to a predetermined frequency, the frequency of the driving signal at which the liquid crystal panel is driven.

8. A liquid crystal display device as set forth in claim 5, further comprising a power source configured to supply a voltage, wherein:
the timing generator includes an internal oscillation circuit configured or programmed to generate, as the driving signal, a clock signal in accordance with the voltage supplied from the power source; and
the correcting circuit is configured or programmed to change the voltage, which is supplied from the power source to the internal oscillation circuit, to a predetermined voltage so as to change a frequency of the clock signal to a predetermined frequency, thereby changing the frequency of the driving signal at which the liquid crystal panel is driven.

9. A method for driving a liquid crystal display device, the liquid crystal display device including:
a liquid crystal panel configured to display an image supplied from outside;
a timing generator configured or programmed to drive the liquid crystal panel in accordance with a driving signal;
a capacitive touch sensor configured to detect a change in capacitance, the capacitive touch panel being provided so as to overlap the liquid crystal panel; and
a touch panel controller configured or programmed to scan the capacitive touch sensor in accordance with a frequency of a reference clock signal which is generated by an oscillation circuit provided in the liquid crystal display device,
the method comprising the steps of:
(a) counting a frequency of the driving signal;
(b) determining whether or not the frequency of the driving signal is a predetermined value; and
(c) changing, in a case where the frequency of the driving signal is determined not to be the predetermined value in the step (b), a frequency at which the capacitive touch sensor is scanned.

* * * * *